US005680689A

United States Patent [19]

Holladay

[11] Patent Number: 5,680,689

[45] Date of Patent: Oct. 28, 1997

[54] HUB REMOVAL TOOL AND METHOD

[76] Inventor: Ray S. Holladay, 670 Hastings St., Boca Raton, Fla. 33487

[21] Appl. No.: 556,388

[22] Filed: Nov. 13, 1995

[51] Int. Cl.[6] .............................. B23P 19/04; B23P 19/00; B25B 27/14

[52] U.S. Cl. .............................. 29/426.5; 29/254; 29/275

[58] Field of Search .............................. 29/254, 255, 426.5, 29/890.035, 275

[56] References Cited

U.S. PATENT DOCUMENTS

| | | | |
|---|---|---|---|
| D. 292,963 | 12/1987 | Murtaugh | D8/51 |
| 855,735 | 6/1907 | Tracy | 29/254 |
| 2,488,001 | 11/1949 | Birk | 29/275 |
| 2,641,831 | 6/1953 | Helton | 29/255 |
| 2,688,795 | 9/1954 | Schwenzfeier | 29/426.5 |
| 3,083,449 | 4/1963 | Simmons | 29/255 |
| 3,358,352 | 12/1967 | Wilcox | 29/254 |
| 3,472,022 | 10/1969 | Leffingwell et al. | 29/275 |
| 4,185,372 | 1/1980 | Dupree et al. | 29/273 |
| 4,259,774 | 4/1981 | Dolinski et al. | 29/263 |
| 4,306,346 | 12/1981 | Winebrenner | 29/275 |
| 4,339,865 | 7/1982 | Shultz | 29/255 |
| 4,418,462 | 12/1983 | Walton | 29/426.5 |
| 4,542,570 | 9/1985 | Prince | 29/252 |
| 4,561,159 | 12/1985 | Schuster | 29/255 |
| 4,642,866 | 2/1987 | Murtaugh | 29/259 |
| 4,984,346 | 1/1991 | Vorhauer | 29/275 |
| 5,067,219 | 11/1991 | Ulmer | 29/252 |
| 5,165,158 | 11/1992 | Markisello | 29/426.5 |
| 5,233,741 | 8/1993 | Maynard | 29/266 |
| 5,315,745 | 5/1994 | Cantwell et al. | 29/260 |

*Primary Examiner*—David P. Bryant
*Assistant Examiner*—Tisa Stewart
*Attorney, Agent, or Firm*—John C. Smith

[57] ABSTRACT

A punch alignment sleeve that fits over the hub of a fan blade assembly or pulley wheel. The punch alignment sleeve has an internal channel which is aligned with and slidably fits over the end of the motor shaft. It has an internal channel running from the end of the motor shaft on the distal end to an aperture on the proximal end which slidably receives a punch. The punch alignment sleeve is held in place on the hub by a recessed area which fits around the periphery of the hub. The punch is struck to jolt the motor shaft loose after the punch alignment sleeve is installed. The internal channel is sized to snugly and slidably hold the shaft end and punch in position such that the shaft is struck by the punch at an angle substantially aligned with its longitudinal axis. The punch alignment sleeve also has optional and removable hub insert sleeves which allow the device to fit multiple size hubs. An optional slot in the side of the distal end of the punch alignment sleeve allows it to fit over a retaining screw in the side of the hub. An optional shaft driver has a cone shaped recess that prevents the shaft tip from mushrooming when struck.

20 Claims, 9 Drawing Sheets

Prior Art

HUB REMOVAL TOOL AND METHOD

BACKGROUND OF THE INVENTION

1. Technical Field

The present invention relates to hub removal tools. In particular, it relates to tools for removing fan blade hubs from motor shafts.

2. Background Art

Currently, technicians who need to service motor driven equipment can spend exorbitant amounts of time attempting to disassemble the equipment due to corroded parts which will not separate from one another. This is particularly troublesome when the equipment is normally outside of the owners premises, as is the case with a typical air conditioning unit.

A substantial amount of wasted technician time and unnecessary expense due to damaged equipment is due to the difficulties associated with the removal of fan blade assemblies from motor shafts on air conditioning units. A common occurrence is the freezing of a fan blade hub to the motor shaft such that it cannot easily slide off of the motor shaft when the motor is replaced. Quite often, the technician is required to replace the fan blade assembly with the motor resulting in extra cost to the consumer. Further, even if the fan blade assembly is finally removed, the process of removing it often results in damage to the fan blade assembly requiring its replacement.

In addition to the cost of the fan blade assembly itself, there are also the associated labor costs which are caused by the time taken by the service technician to return to a parts distribution center to obtain a new fan blade assembly.

Another problem associated with motor driven fans, such as those used in air conditioning units, is the difficulty in reaching the hub of the fan blade assembly in order to remove it. This is caused by the cage assemblies which usually encase an air handling unit or like device. While the prior art has provided devices for removing hubs from shafts, the prior art devices have not proved effective for enclosed units such as air handling units. One reason for this is the lack of space inside the air conditioning unit to accommodate the device. An example of a prior art device with this problem is the hydraulic jack type of hub remover which pushes the hub off of the shaft from the rear. This type of device will not work with a typical air conditioning unit because it simply will not fit between the motor and the hub of the fan blade assembly.

Another method of removing a hub from a shaft has been to strike the end of the shaft with a hammer and thereby jolt the hub loose. Of course, there are a number of problems associated with this method. First, the shaft may be bent which will make removal of the hub difficult if not impossible. Second, the end of the shaft may mushroom. If the shaft end mushrooms, then the shaft must be sawed through to allow the hub to be removed.

It would be desirable to have a tool which can be easily used to remove a hub from a motor shaft without removing the cage assembly or having to with between the motor and the hub. Further, it would be desirable to have a hub removal tool which could quickly and easily remove a hub from a shaft without damaging the shaft or mushrooming the end of the shaft.

The prior art has failed to provide a device which can quickly remove a hub from a shaft, which can be used without placement of the device between the motor and the hub, and which prevents damage to the shaft and the hub during removal of the hub from the shaft.

SUMMARY OF THE INVENTION

The present invention solves the foregoing problems by providing a punch alignment sleeve that fits over the hub. The punch alignment sleeve has an internal channel which is aligned with, and can slidably fit over, the end of the motor shaft at its distal end and has an aperture at its proximal end to slidably receive a punch. The punch alignment sleeve is held in place on the hub by a recessed area which fits around the periphery of the hub. The punch is struck to jolt the motor shaft loose after the punch alignment sleeve is installed. The internal channel is sized to snugly and slidably hold the shaft end and the punch in position such that the shaft is struck by the punch at an angle substantially aligned with its longitudinal axis. The punch alignment sleeve also has optional and removable hub insert sleeves which allow the device to fit multiple size hubs. Another embodiment has a slot in the side of the distal end of the punch alignment sleeve which allows the punch alignment sleeve to fit over a retaining screw in the side of the hub. Another embodiment has an optional shaft driver which has a cone shaped recess. The cone shaped recess prevents the shaft tip from mushrooming when struck.

DESCRIPTION OF THE PREFERRED EMBODIMENT

For ease of illustration, the following descriptions use a fan blade assembly as an example. However, as a matter of definition in this specification, the hub 106 can be the hub of any device attached to a motor shaft or a pulley wheel attached to any type of shaft.

The hub removal tool disclosed herein provides several advantages over the prior art. In particular, prior art methods usually result in replacement of fan blade assemblies because they are either damaged during removal from a motor shaft or they cannot be removed at all. The instant invention allows the service technician to easily and quickly remove a fan blade assembly without damage.

By reusing the fan blade assembly, several benefits are achieved. First, the cost of a new fan blade assembly is avoided. Second, the service technician will not have to return to the supply house to obtain a new fan blade assembly. This reduces the total amount of time on the service call and therefore, the billable time required to complete the call. Third, the air conditioner can be repaired more quickly to increase the consumers comfort.

The hub removal tool is designed to accommodate virtually all commercial and residential air conditioning units. Therefore the service technician has the ability to carry a single tool, which is relatively light and easy to store, when embarking on a service call.

By reducing parts replacement and reducing the total amount of time on a service call by providing a small device which is easy to carry, the hub removal tool benefits the consumer by reducing costs and time to repair, and benefits the service technician by making the technician's job easier and making the technician more productive.

Figure 1A:
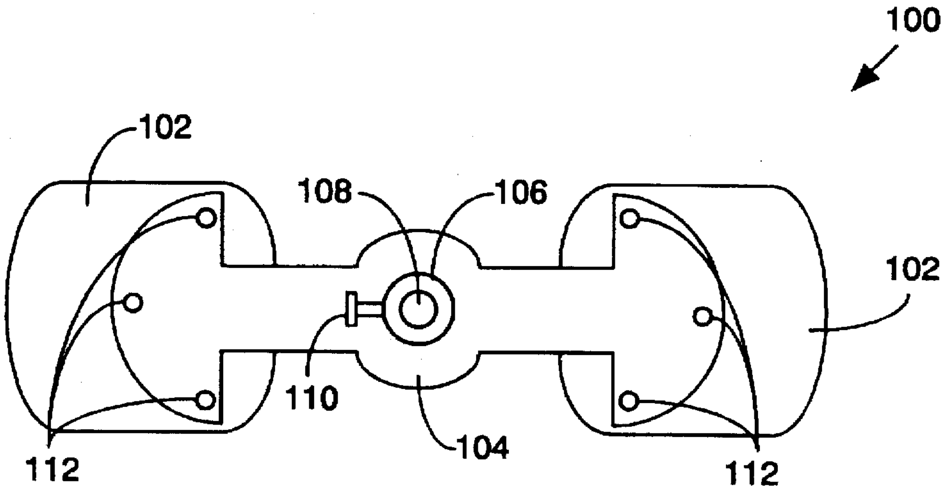
FIG. 1A is a front view of a prior art fan blade assembly.

Referring to FIG. 1A, a conventional prior art fan blade assembly 100 is shown. Fan blade assembly 100 uses blades 102 which are attached to support arm 104 by rivets 112. A hub 106 has a central aperture 108 to accept a motor shaft 502 (shown in FIGS. 5A and 5B). Retaining screw 110 is used to secure hub 106 to motor shaft 502.

Figure 1B:
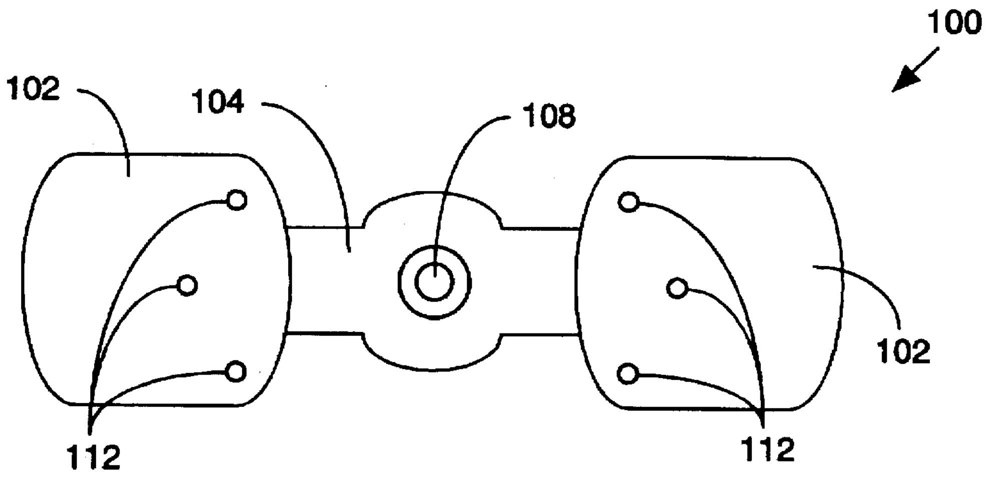
FIG. 1B is a rear view of the prior art fan blade assembly of FIG. 1A.

FIG. 1B is a rear view of fan blade assembly 100.

Figure 2A:
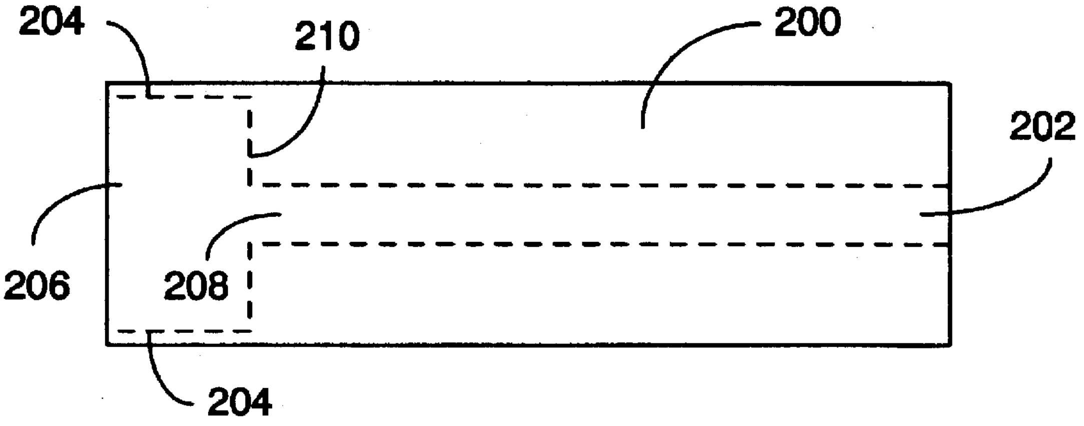
FIG. 2A is a cutaway side view of the preferred embodiment of the punch alignment sleeve.

FIG. 2A is a side cutaway view of punch alignment sleeve 200. Punch alignment sleeve 200 has a recessed area 206 at its distal end. Recessed area 206 has a diameter which is sufficiently wide enough to slidably and snugly fit side wall 204 over the side of hub 106. Hub stop wall 210 rest against the front surface of hub 106 such that longitudinal channel 208 is in substantial alignment with the longitudinal axis of motor shaft 502.

In the preferred embodiment, the diameter of longitudinal channel 208 is slightly larger than the diameter of motor shaft 502. This allows motor shaft 502, if it extends outward from hub 106, to be slidably inserted into longitudinal channel 208. A aperture 202 at the proximal end of punch alignment sleeve 200 allows access to longitudinal channel 208 by a punch 300 (shown in FIG. 3A).

Figure 2B:
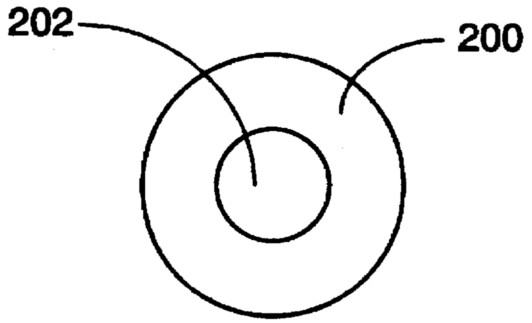
FIG. 2B is a proximal end view of the punch alignment sleeve of FIG. 2A.

FIG. 2B is a proximal end view of punch alignment sleeve 200 showing the aperture 202.

Figure 2C:
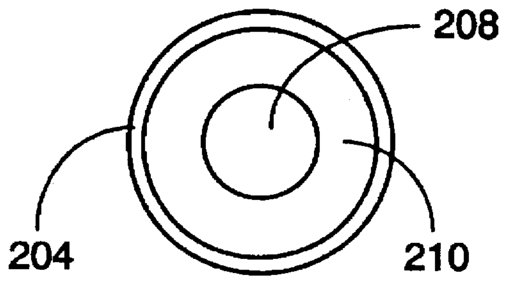
FIG. 2C is a distal end view of the punch alignment sleeve of FIG. 2A.

FIG. 2C is a distal end view of punch alignment sleeve 200. This view illustrates longitudinal channel 208, hub stop wall 210 and side wall 204. Those skilled in the art will recognize that while punch alignment sleeve 200 is shown as being generally circular along its longitudinal axis, it can be made in any convenient shape so long as it can be secured to the hub 106 and fit suitably over motor shaft 502.

Figure 3A:
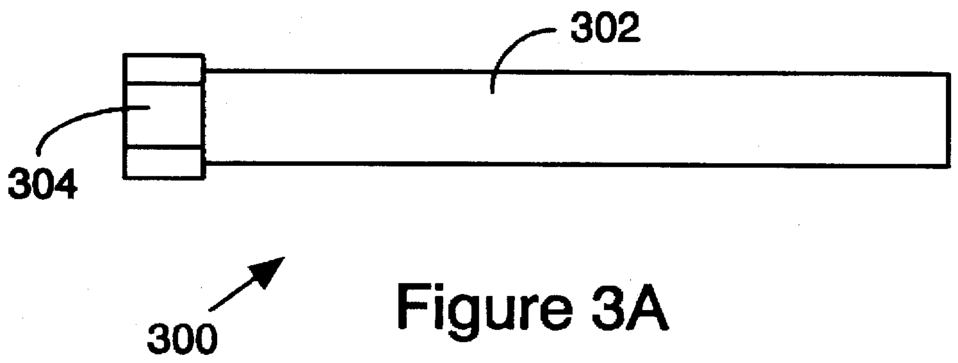
FIG. 3A is a side view of the punch used with the preferred embodiment of the punch alignment sleeve.

FIG. 3A is a side view of punch 300. Driving shaft 302 and striking surface 304 are shown.

Figure 3B:
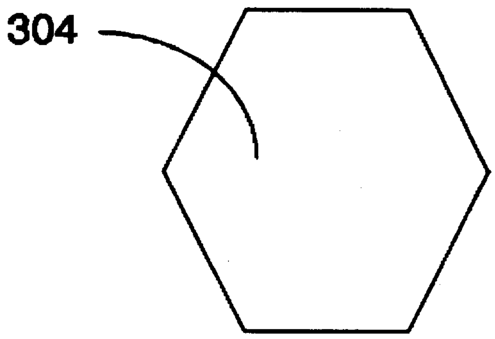
FIG. 3B is a proximal end view of the punch of FIG. 3A.

FIG. 3B is a proximal end view of punch 300 showing striking surface 304. The shape of striking surface 304 is not critical and may be shaped in any convenient manner. However, by widening striking surface 304, punch 300 is prevented from slipping inside punch alignment sleeve 200 when punch 300 is struck.

Figure 3C:
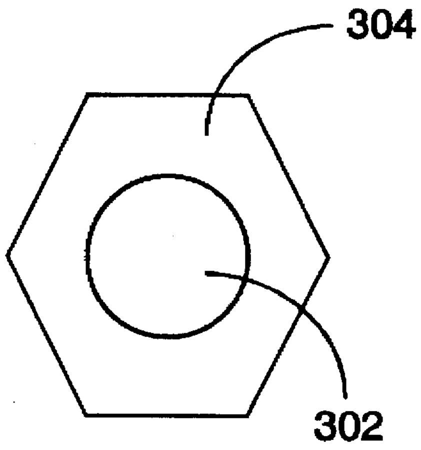
FIG. 3C is a distal end view of the punch of FIG. 3A.

FIG. 3C is a distal end view of punch 300.

Figure 4A:
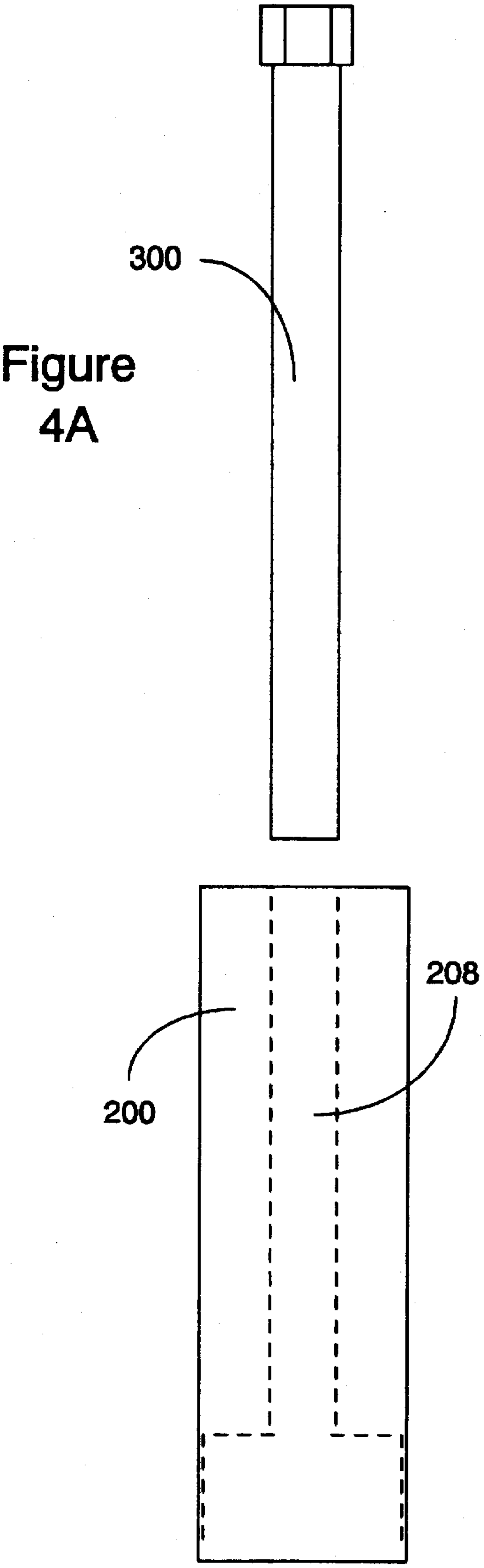
FIG. 4A is an exploded cutaway view of the punch and punch alignment sleeve used in the preferred embodiment.

FIG. 4A is an exploded side cutaway view of punch alignment sleeve 200 and punch 300. Punch 300 is shown in position prior to being inserted into longitudinal channel 208.

Figure 4B:
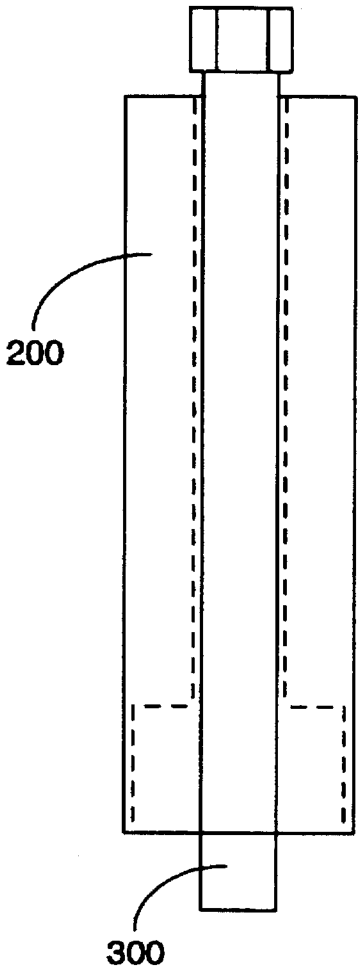
FIG. 4B is a cutaway view of the punch and punch alignment sleeve of FIG. 4A in the joined position.

In FIG. 4B, punch 300 is shown fully inserted into punch alignment sleeve 200. As can be seen, punch 300 is designed to snugly and slidably fit into longitudinal channel 208. By sizing longitudinal channel 208 in this manner, punch 300 is more accurately controlled and directed to the end of motor shaft 502.

Figure 5A:
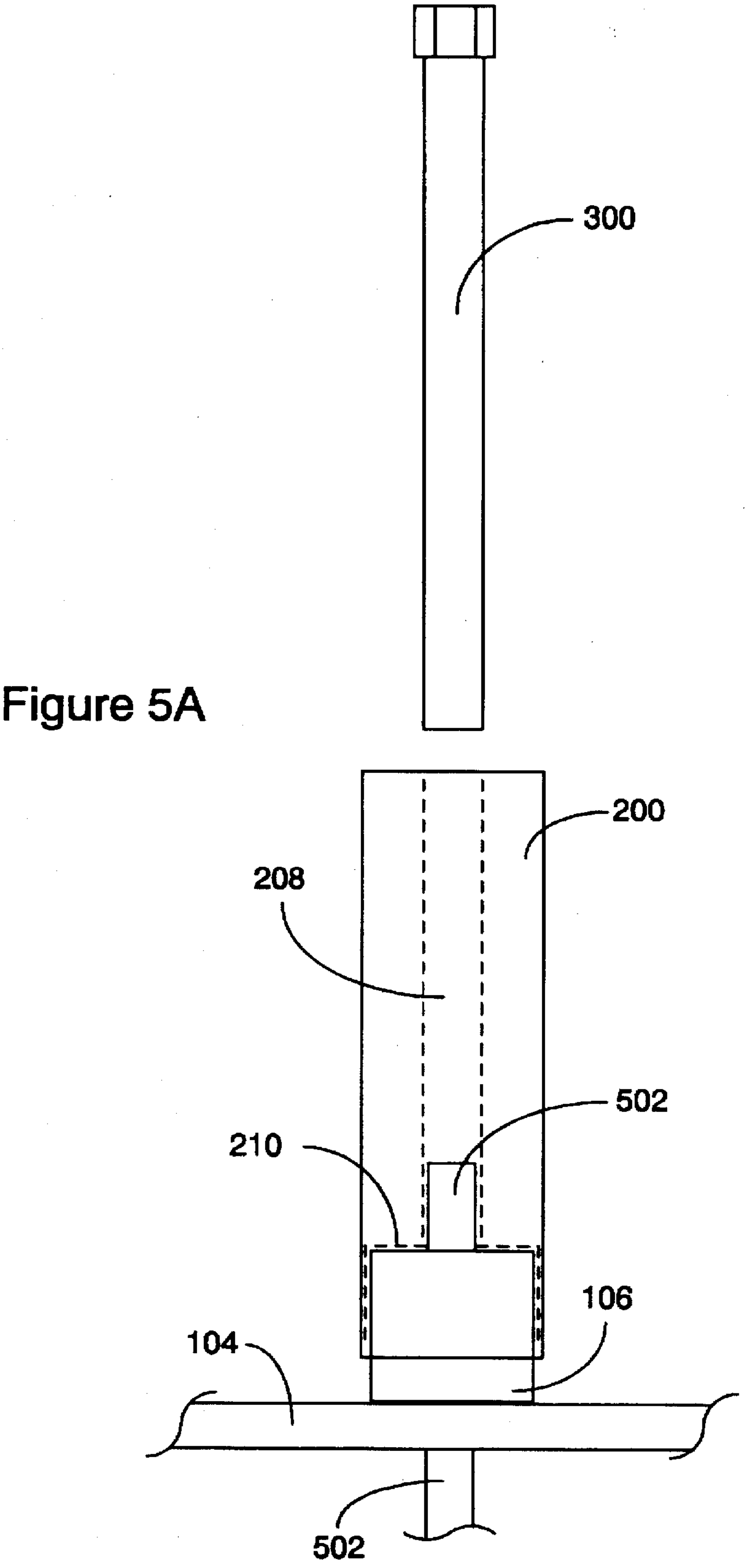
FIG. 5A is an exploded cutaway view of the punch and punch alignment sleeve used in the preferred embodiment mounted on the hub of the fan blade assembly of FIG. 1A.

FIG. 5A illustrates the punch alignment sleeve 200 mounted over a hub 106. In this figure motor shaft 502 is shown protruding from hub 106 into longitudinal channel 208. The advantage of having the diameter of longitudinal channel 208 slightly larger than the diameter of motor shaft 502 is that it allows punch alignment sleeve 200 to be fully and securely mounted over hub 106 with hub 106 coming to rest against hub stop wall 210. Punch 300 is shown just prior to insertion into longitudinal channel 208.

Figure 5B:
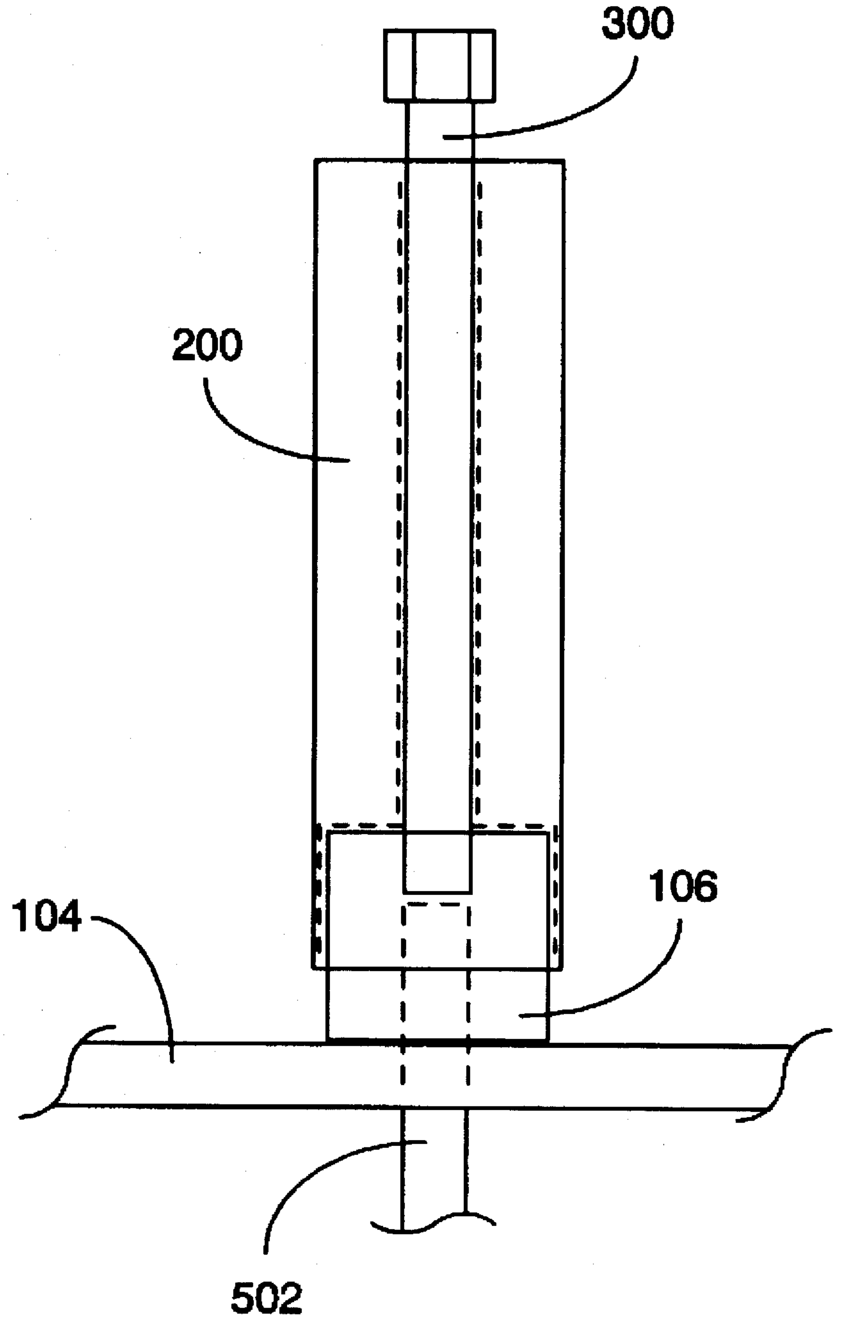
FIG. 5B is an exploded cutaway view of the punch and punch alignment sleeve used in the preferred embodiment mounted on the hub of the fan blade assembly of FIG. 1A and after the punch has been struck to loosen the hub from the shaft.

FIG. 5B is a side cutaway view which illustrates the position of punch 300 inside punch alignment sleeve 200 after punch 300 has been struck. In this figure motor shaft 502 has been moved backward into hub 106 after being struck by punch 300. Those skilled in the art will recognize that punch 300 should have sufficient length to push motor shaft 502 completely out of hub 106.

Figure 6A:
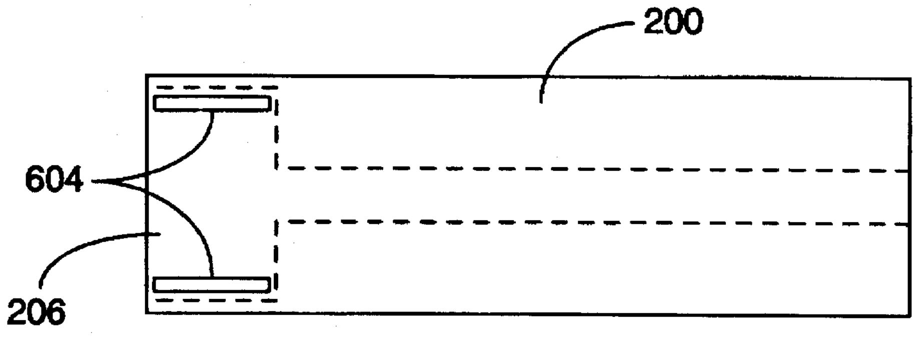
FIG. 6A is an exploded cutaway view of the punch alignment sleeve used in the preferred embodiment with a hub insert sleeve mounted in the recessed area.

FIG. 6A is a side cutaway view of punch alignment sleeve 200. In this view, optional hub insert sleeve 604 is shown mounted within the distal end of punch alignment sleeve 200. Hub insert sleeve 604 reduces the inner diameter of recesses area 206. As a result, the same punch alignment sleeve 200 can be securely mounted on hubs 106 of varying diameters.

Figure 6C:
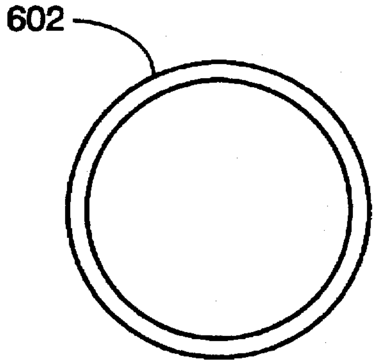
FIG. 6C is an end view of an alternative hub insert sleeve.
Figure 6D:
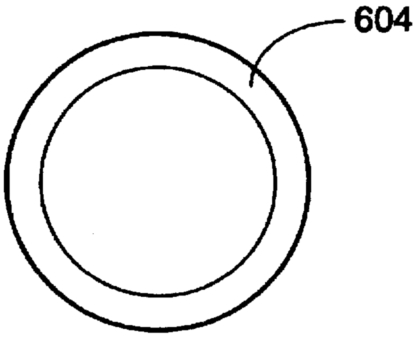
FIG. 6D is a distal end view of the punch alignment sleeve with a hub insert sleeve mounted in the recessed area.
Figure 6B:
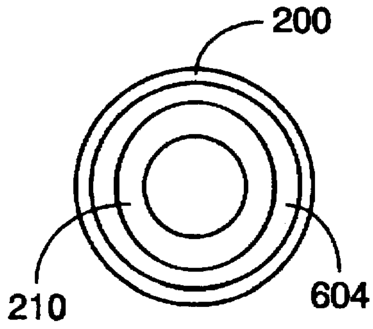
FIG. 6B is an end view of the hub insert sleeve of FIG. 6A.

FIG. 6B is a distal end view of punch alignment sleeve 200. This view shows the reduced diameter provided by hub insert sleeve 604.

FIGS. 6C and 6D illustrate two different sizes for hub insert sleeves 602, 604. The outer diameter should remain the same and be just wide enough to fit snugly within recessed area 206 of punch alignment tool 200. The inner diameter varies to produce the desired size.

Those skilled in the art will recognize that hubs can be any desired size to fit a particular engineering purpose. However, in practice most hubs used for air conditioning units tend to be one of three sizes. Therefore, a service technician can, through the use of two hub insert sleeves 602, 604 use the same punch alignment sleeve 200 for almost all air conditioners used in commercial and residential installations.

In the preferred embodiment, the hub removal tool has measurements which are approximately as follows:

1) Punch Alignment Sleeve 200 a) Diameter: 1.5 inches
b) Length: 5 inches
c) Recessed area 206:
I) Diameter: 1.385 inches
II) Depth: 0.75 inches
d) Longitudinal Channel 208:
I) Diameter: 0.51 inches
2) Punch 300
a) Length: 6 inches
b) Diameter: 0.5 inches
3) Hub Insert Sleeve 602
a) Outside diameter: 1.370 inches
b) Length: 0.75 inches
c) Inside diameter: 1.255 inches
4) Hub Insert Sleeve 604
a) Outside diameter: 1.370 inches
b) Length: 0.75 inches
c) Inside diameter: 1.005 inches
5) Shaft Driver 700
a) Diameter: 0.875 inches
b) Length: 3 inches
c) Aperture 702 diameter: 0.51 inches
d) Aperture 702 length: 0.5 inches While the above measurements reflect the sizes used in the preferred embodiment, those skilled in the art will recognize that measurements can vary to suit a particular application. The device can be used to remove items other than fan blade assemblies. For example, pulleys can also be removed so long as the hub removal tool is suitably sized.

In addition to using hub insert sleeves 602, 604 for the purpose of using the same punch alignment tool 200 for multiple hub sizes, an additional sleeve (not shown) can also be inserted into longitudinal channel 206. This would allow use of the punch alignment sleeve 200 with multiple motor shaft 502 and punch 300 diameter sizes.

Figure 7A:
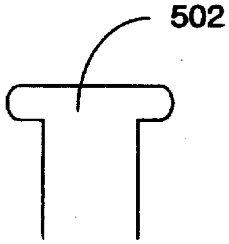
FIG. 7A is a side view of a motor shaft which has mushroomed as a result of being struck.

FIG. 7A illustrates a motor shaft 502 after being struck by a prior art technique. As can be seen, the end of the motor shaft 502 is mushroomed from impact. Due to the mushrooming, even if the hub 106 is loosened, it will not fit over the motor shaft 502. If the motor shaft 502 is mushroomed, then in order to remove hub 106, motor shaft 502 must be cut or hub 106 must be replaced with the motor. Typically, the service technician will use the invention to remove a hub 106 from a mushroomed motor shaft 502 as follows:

1) Cut the motor shaft 502 between the hub 106 and the motor (not shown) to separate hub 106 from the motor assembly.
2) Place the punch alignment sleeve 200 on a flat surface with the recessed area 206 facing up.
3) Insert hub 106 into recessed area 206.
4) Use punch 200 of shaft driver 700 (discussed more fully below in regard to FIG. 7) to push the cut portion of motor shaft 502 through central aperture 108 and longitudinal channel 202, thereby separating hub 106 from motor shaft 502.

By using the foregoing procedure, the service technician can salvage the fan blade assembly 100 from a defective motor. Further, the technician will not have to replace an expensive fan blade assembly 100 and will avoid the extra time it would have taken to return to a parts center to obtain a new fan blade assembly 100. As a result, the consumer will have the air conditioner repaired in a more timely fashion and will avoid the expense of parts which had to be replaced in prior art procedures.

In some cases the motor shaft 502 can extend a considerable distance beyond hub 106. In fact, a motor shaft 502 can be long enough that it extends through longitudinal channel 208 and through aperture 202. In this event, punch 300 cannot be held in alignment by punch alignment sleeve 200.

Figure 7B:
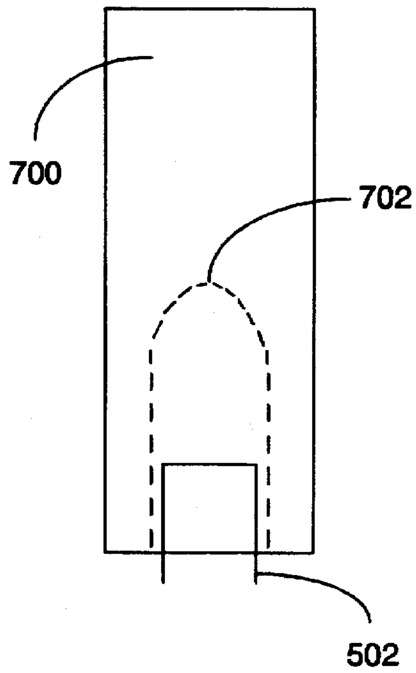
FIG. 7B is a cutaway side view of a shaft driver mounted over the end of a motor shaft.

In FIG. 7B, an optional shaft driver 700 is shown. Optional shaft driver 700 has shaft receiving aperture 702 in the distal end to receive the end of motor shaft 502. The shaft receiving aperture 702 is tapered into a cone shaped structure. The cone shape has the advantage of preventing mushrooming when struck. As a result, a service technician can mount the shaft driver 700 on a motor shaft 502, hold hub 106 and strike the proximal end of shaft driver 700. The impact will loosen hub 106 from motor shaft 502. In addition, if the end of motor shaft 502 is deformed by the impact, the cone shape of shaft receiving aperture 702 will form the end of motor shaft 502 into a tapered cone shape which can slide through the hub 106 without requiring motor shaft 502 to be cut.

Figure 7C:
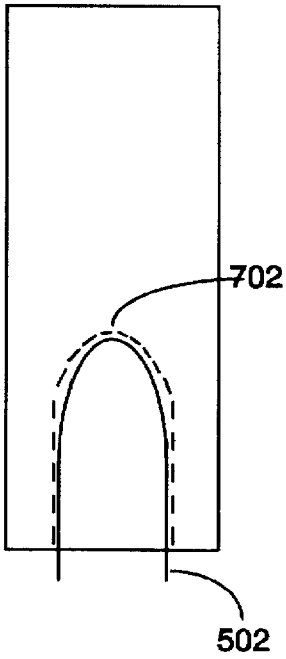
FIG. 7C is a cutaway side view of a shaft driver showing the coning effect on the tip of the motor shaft after the motor shaft is struck.

FIG. 7C illustrates the end of motor shaft 502 with the tapering that results from the cone shaped structure of shaft receiving aperture 702.

Figure 8:
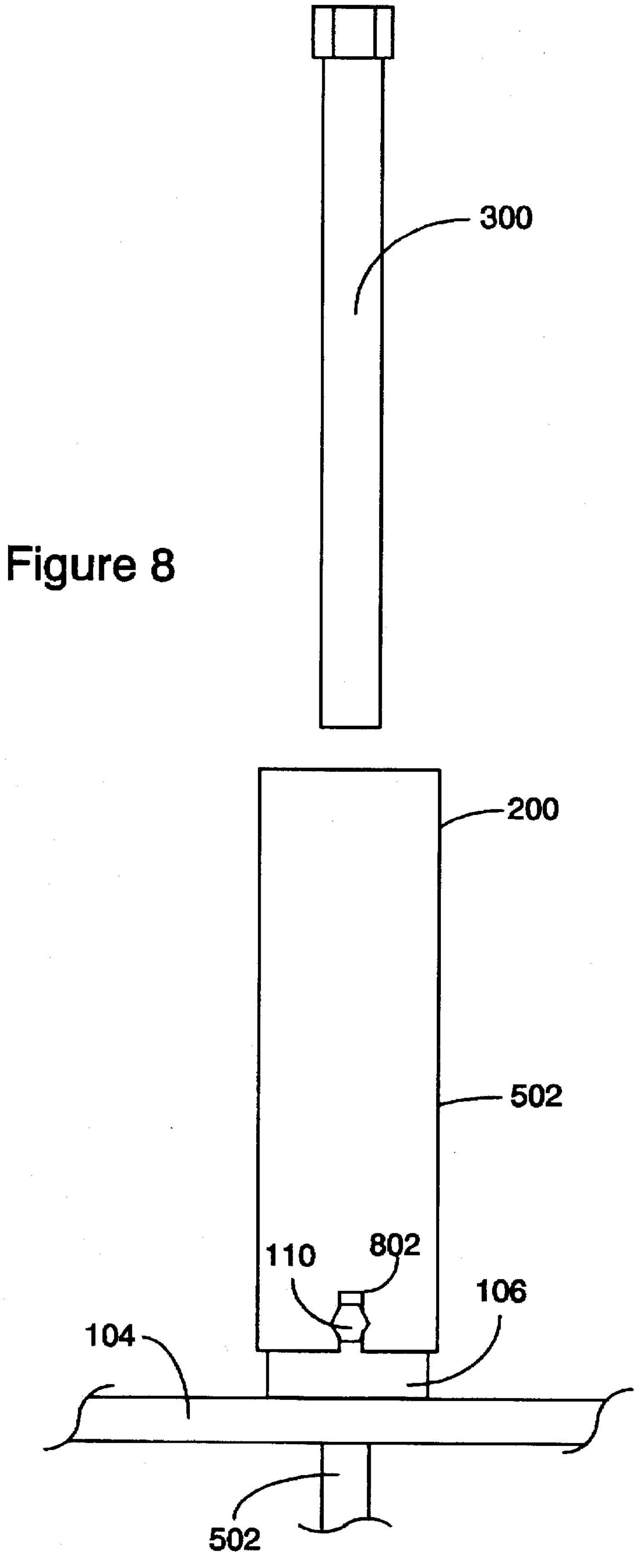
FIG. 8 is a side view of an alternative embodiment of the punch and punch alignment sleeve mounted on the hub of the fan blade assembly of FIG. 1A. This embodiment illustrates the slot used to fit the punch alignment sleeve over the retaining screw on the hub.

FIG. 8 illustrates an alternative embodiment of the punch alignment sleeve 200 which as a slot 802 in the distal end. Slot 802 fits around retaining screw 110 and allows punch alignment sleeve 200 to be fully mounted onto hub 106 even if retaining screw 110 cannot be removed. Of course, retaining screw 110 must be loose enough to allow motor shaft 502 to move within central aperture 108

In the preferred embodiment, punch alignment sleeve 200 is made from lightweight material such as aluminum, and punch 300 is made from steel. However, any suitable material can be used to manufacture the device so long as it has the strength required to resist impact damage.

Of course, while the use of the device was illustrated for air conditioner hubs mounted on motor shafts, those skilled in the art will recognize that the device can be applied to any type of hub or pulley wheel mounted on any type of shaft.

While the invention has been described with respect to a preferred embodiment thereof, it will be understood by those skilled in the art that various changes in detail my be made therein without departing from the spirit, scope, and teaching of the invention. For example, materials used to construct the device can vary. Sizes can vary to suit not only air conditioning fan blade assembly hubs, but any size hub used for any purpose. The only requirement being the need to remove the hub from a shaft. Accordingly, the invention herein disclosed is to be limited only as specified in the following claims.

I claim:

1. A hub removal tool for removing a hub from a motor shaft, comprising:

a punch having a distal end and a proximal end;

a punch alignment sleeve, further comprising:

a punch guide wall having a proximal aperture and a distal aperture;

a hub alignment recess in the distal end, the hub alignment recess having a diameter sized to slidably receive a hub, and further having a hub stop wall with a depth sufficient to allow the hub to be held securely against the hub stop wall;

a longitudinal channel extending through the punch guide wall from the distal aperture to the hub stop wall, the longitudinal channel having a diameter smaller than the diameter of the hub alignment recess and sized to slidably receive the distal end of the punch, the longitudinal channel further aligned with the hub alignment recess such that a motor shaft extending through the hub will slidably fit within the longitudinal channel; and the punch further having a sufficient length to contact the motor shaft at its distal end, extend through the longitudinal channel, and extend from the proximal aperture of the punch guide wall at the punch's proximal end;

whereby the punch alignment sleeve, when mounted on the hub, holds the punch in alignment with the motor shaft such that when the punch is struck, it forces the motor shaft out of the hub.

2. A hub removal tool, as in claim 1, further comprising at least one hub insert sleeve having an outer diameter sufficient to slidably fit within the hub alignment recess, and an inside diameter sufficient to slidably fit over a reduced diameter sized hub.

3. A hub removal tool, as in claim 2, further comprising a shaft driver having a proximal end and a distal end, the distal end having an aperture with a diameter capable of slidably fitting over a motor shaft, the proximal end of the aperture having a coned shape such that when the shaft driver is placed over a motor shaft and struck, the end of the motor shaft will be coned when the coned surface of the proximal end of the shaft driver impacts against the end of the motor shaft.

4. A hub removal tool, as in claim 3, wherein the punch alignment sleeve has a slot extending from its distal end and the slot has a diameter sufficient to fit over a hub retaining screw extending from the side of the hub.

5. A hub removal tool, as in claim 1, further comprising a shaft driver having a proximal end and a distal end, the distal end having an aperture with a diameter capable of slidably fitting over a motor shaft, the proximal end of the aperture having a coned shape such that when the shaft driver is placed over a motor shaft and struck, the end of the motor shaft will be coned when the coned surface of the proximal end of the shaft driver impacts against the end of the motor shaft.

6. A hub removal tool, as in claim 5, wherein the punch alignment sleeve has a slot extending from its distal end the slot has a diameter sufficient to fit over a hub retaining screw extending from the side of the hub.

7. A hub removal tool, as in claim 1, wherein the punch alignment sleeve has a slot extending from its distal end and the slot has a diameter sufficient to fit over a hub retaining screw extending from the side of the hub.

8. A method of removing a hub from a motor shaft, including the steps of:

placing a punch alignment sleeve over a hub, the punch alignment sleeve having a punch guide wall, a proximal aperture a distal aperture, and a hub alignment recess, the hub alignment recess is located in the distal end of the punch alignment sleeve, has a diameter sized to slidably receive a hub, and further has a hub stop wall with a depth sufficient to allow the hub to be held securely against the hub stop wall, and a longitudinal channel extending through the punch guide wall from the distal aperture to the hub stop wall, the longitudinal channel having a diameter smaller than the diameter of the hub alignment recess and sized to slidably receive the distal end of the punch, the longitudinal channel further aligned with the hub alignment recess such that a motor shaft extending through the hub will slidably fit within the longitudinal channel;

inserting a punch into the longitudinal channel such the distal end of the punch is in contact with the end of the motor shaft;

holding the punch alignment sleeve against the hub while striking the proximal end of the punch such the distal end of the punch impacts the motor shaft;

wherein the punch is held in alignment with the motor shaft when the punch is struck.

9. A method, as in claim 8, including the additional step of inserting at least one hub insert sleeve having an outer diameter sufficient to slidably fit within the hub alignment recess, and an inside diameter sufficient to slidably fit over a reduced diameter sized hub.

10. A method, as in claim 9, including the additional step of coning the end of the motor shaft with a shaft driver having a proximal end and a distal end, the distal end having an aperture with a diameter capable of slidably fitting over a motor shaft, the proximal end of the aperture having a coned shape such that when the shaft driver is placed over a motor shaft and struck, the end of the motor shaft will be coned when it comes in contact with the cone shaped proximal end of the shaft driver.

11. A method, as in claim 10, including the additional step of forming a slot in the distal end of the punch alignment sleeve to fit over a hub retaining screw extending from the side of the hub.

12. A method, as in claim 8, including the additional step of using a shaft driver to loosen the hub from a motor shaft, the shaft driver having a proximal end and a distal end, the distal end having an aperture with a diameter capable of slidably fitting over a motor shaft, the proximal end of the aperture having a coned shape such that when the shaft driver is placed over a motor shaft and struck, the end of the motor shaft will be coned when the coned shape of the proximal end of the shaft driver impacts against the end of the motor shaft.

13. A method, as in claim 12, including the additional step of forming a slot in the distal end of the punch alignment sleeve to fit over a hub retaining screw extending from the side of the hub.

14. A method, as in claim 8, including the additional step of forming a slot in distal end of the punch alignment sleeve to fit over a hub retaining screw extending from the side of the hub.

15. A hub removal tool for removing a hub from a motor shaft, comprising:

a punch having a distal end and a proximal end;

a punch alignment sleeve, further comprising:

- a punch guide wall having a proximal aperture and a distal aperture;
- a hub alignment recess in the distal end, the hub alignment recess having a diameter sized to slidably receive a hub, and further having a hub stop wall with a depth sufficient to allow the hub to be held securely against the hub stop wall; and
- a longitudinal channel extending through the punch guide wall from the distal aperture to the hub stop wall, the longitudinal channel having a diameter smaller than the diameter of the hub alignment recess and sized to slidably receive the distal end of the punch, the longitudinal channel is aligned with the hub alignment recess such that a motor shaft extending through the hub will slidably fit within the longitudinal channel;

the punch further having a sufficient length to contact the motor shaft at its distal end, extend through the longitudinal channel, and extend from the proximal aperture of the punch guide wall at the punch's proximal end; and at least one hub insert sleeve having an outer diameter sufficient to slidably fit within the hub alignment recess, and an inside diameter sufficient to slidably fit over a reduced diameter sized hub;

whereby the punch alignment sleeve, when mounted on the hub, holds the punch in alignment with the motor shaft such that when the punch is struck, it forces the motor shaft out of the hub.

16. A hub removal tool, as in claim 15, further comprising a shaft driver having a proximal end and a distal end, the distal end having an aperture with a diameter capable of slidably fitting over a motor shaft, the proximal end of the aperture having a coned shape such that when the shaft driver is placed over a motor shaft and struck, the end of the motor shaft will be coned when the coned surface of the proximal end of the shaft driver impacts against the end of the motor shaft.

17. A hub removal tool, as in claim 15, wherein the punch alignment sleeve has a slot extending from its distal end and the slot has a diameter sufficient to fit over a hub retaining screw extending from the side of the hub.

18. A hub removal tool for removing a hub from a motor shaft, comprising:

a punch having a distal end and a proximal end;

a punch alignment sleeve, further comprising:

a punch guide wall having a proximal aperture and a distal aperture;

a hub alignment recess in the distal end, the hub alignment recess having a diameter sized to slidably receive a hub, and further having a hub stop wall with a depth sufficient to allow the hub to be held securely against the hub stop wall;

a longitudinal channel extending through the punch guide wall from the distal aperture to the hub stop wall, the longitudinal channel having a diameter smaller than the diameter of the hub alignment recess and sized to slidably receive the distal end of the punch, the longitudinal channel further aligned with the hub alignment recess such that a motor shaft extending through the hub will slidably fit within the longitudinal channel;

at least one slot extending from its distal end and the slot has a diameter sufficient to fit over a hub retaining screw extending from the side of the hub; and the punch further having a sufficient length to contact the motor shaft at its distal end, extend through the longitudinal channel, and extend from the proximal aperture of the punch guide wall at the punch's proximal end;

whereby the punch alignment sleeve, when mounted on the hub, holds the punch in alignment with the motor shaft such that when the punch is struck, it forces the motor shaft out of the hub.

19. A hub removal tool, as in claim 18, further comprising at least one hub insert sleeve having an outer diameter sufficient to slidably fit within the hub alignment recess, and an inside diameter sufficient to slidably fit over a reduced diameter sized hub.

20. A hub removal tool, as in claim 18, further comprising a shaft driver having a proximal end and a distal end, the distal end having an aperture with a diameter capable of slidably fitting over a motor shaft, the proximal end of the aperture having a coned shape such that when the shaft driver is placed over a motor shaft and struck, the end of the motor shaft will be coned when the coned surface of the proximal end of the shaft driver impacts against the end of the motor shaft.

* * * * *